US008451756B2

(12) United States Patent
Lucani et al.

(10) Patent No.: US 8,451,756 B2
(45) Date of Patent: *May 28, 2013

(54) RANDOM LINEAR NETWORK CODING FOR TIME DIVISION DUPLEXING

(75) Inventors: Daniel E. Lucani, Oporto (PT); Milica Stojanovic, Boston, MA (US); Muriel Medard, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/471,496

(22) Filed: May 15, 2012

(65) Prior Publication Data

US 2012/0236763 A1    Sep. 20, 2012

Related U.S. Application Data

(63) Continuation of application No. 12/549,725, filed on Aug. 28, 2009, now Pat. No. 8,279,781.

(60) Provisional application No. 61/092,543, filed on Aug. 28, 2008, provisional application No. 61/187,016, filed on Jun. 15, 2009.

(51) Int. Cl.
*H04B 1/56* (2006.01)
*H04L 5/16* (2006.01)
*H04L 12/66* (2006.01)

(52) U.S. Cl.
USPC ............ 370/276; 370/296; 370/461; 370/463

(58) Field of Classification Search
USPC ................. 370/276, 282, 294, 296, 431, 432, 370/462, 463
See application file for complete search history.

(56) References Cited

U.S. PATENT DOCUMENTS

| 6,621,851 | B1 * | 9/2003 | Agee et al. .................... 370/242 |
| 7,760,728 | B2 | 7/2010 | Chou et al. |
| 7,876,677 | B2 | 1/2011 | Cheshire |
| 2003/0214951 | A1 | 11/2003 | Joshi et al. |

(Continued)

FOREIGN PATENT DOCUMENTS

EP          1 638 239 A1    3/2006
WO     WO 2007/109216 A1    9/2007

(Continued)

OTHER PUBLICATIONS

International Preliminary Report on Patentability of the ISA for PCT/US2009/055359 dated Apr. 21, 2011.

(Continued)

*Primary Examiner* — Kerri Rose
(74) *Attorney, Agent, or Firm* — Daly, Crowley, Mofford & Durkee, LLP

(57) ABSTRACT

Subject matter disclosed herein relates to random linear network coding schemes for reliable communications for time division duplexing channels. In at least one embodiment, a transmitter node transmits M data packets through a half-duplex link using random linear network coding. The transmitter node transmits coded packets back-to-back through the link before stopping to wait for an acknowledgement (ACK) packet. An optimal number of coded packets $N_i$ to be transmitted in a subsequent transmission may then be determined based, at least in part, on a number of degrees of freedom (DOFs) a receiving node needs to decode the M information packets from received coded packets.

27 Claims, 11 Drawing Sheets

U.S. PATENT DOCUMENTS

| | | | |
|---|---|---|---|
| 2005/0078653 A1 | 4/2005 | Agashe et al. | |
| 2005/0251721 A1 | 11/2005 | Ramesh et al. | |
| 2009/0175320 A1* | 7/2009 | Haustein et al. | 375/219 |
| 2010/0046371 A1* | 2/2010 | Sundararajan et al. | 370/235 |

FOREIGN PATENT DOCUMENTS

| | | |
|---|---|---|
| WO | WO 2010/005181 A2 | 1/2010 |
| WO | WO 2010/005181 A3 | 1/2010 |
| WO | WO 2010/025362 A2 | 3/2010 |

OTHER PUBLICATIONS

Lucani et al; "Broadcasting in Time-Division Duplexing: A Random Linear Network Coding Approach;" presented Switzerland; Conference: NetCod 2009, Lausanne, Switzerland; Jun. 2009; 6 pages.

Lucani et al; "On Coding for Delay—New Approaches Based on Network Coding in Networks with Large Latency;" Conference: ITA Workshop, San Diego, USA; Feb. 2009; 10 pages.

Lucani et al; "Random Linear Network Coding for Time Division Duplexing: Energy Analysis;" Conference: ICC 2009, Dresden, Germany; Jun. 2009; 5 pages.

Lucani et al; "Random Linear Network Coding for Time-Division Duplexing: Field Size Considerations;" Conference: GLOBECOM 2009, Hawaii, USA; Dec. 2009; 6 pages.

Lucani et al; "Random Linear Network Coding for Time-Division Duplexing: Queueing Analysis;" Conference ISIT 2009, Seoul, Korea; Jul. 2009; 5 pages.

Lucani et al; "Random Linear Network Coding for Time-Division Duplexing: when to stop talking and start listening;" Presentation in INFOCOM; Slide Presentation; Apr. 23, 2009; 10 pages.

Lucani et al; "On Coding for Delay New Approaches based on Network Coding in Networks with Large Latency;" Conference ITA Workshop, San Diego, USA; Slide Presentation; Feb. 13, 2009; 12 pages.

Lucani et al; "Random Linear Network Coding for Time-Division Duplexing: when to stop talking and start listening;" Presentation in ICC; Slide Presentation; Jun. 16, 2009; 6 pages.

Lucani et al.; "On Coding for Delay New Approaches based on Network Coding in Network Coding in Networks with Large Latency;" Presentation in NetCod; Slide Presentation; Jun. 16, 2009; 17 pages.

PCT Search Report of the ISA for PCT/US2009/055359 dated Mar. 30, 2011.

Written Opinion of the ISA for PCT/US2009/055359 dated Mar. 30, 2011.

U.S. Appl. No. 12/549,725, filed Aug. 28, 2009.

U.S. Appl. No. 12/474,738, filed May 29, 2009.

* cited by examiner

RANDOM LINEAR NETWORK CODING FOR TIME DIVISION DUPLEXING

CROSS REFERENCE TO RELATED APPLICATION

This application is a continuation of U.S. application Ser. No. 12/549,725, filed Aug. 28, 2009, which claims the benefit, under 35 U.S.C. §119(e), of U.S. Provisional Application No. 61/092,543, filed Aug. 28, 2008, and U.S. Provisional Application No. 61/187,016, filed Jun. 15, 2009, which applications are each hereby incorporated herein by reference in their entirety.

GOVERNMENT RIGHTS

This work was supported in part by the National Science Foundation under grant Nos. 0520075, 0427502, and CNS-0627021, by ONR MURI Grant No. N00014-07-1-0738, and by United States Department of the Navy's Space and Naval Warfare Systems Command (SPAWAR) under Contract No. N66001-06-C-2020 through BAE Systems. The Government has certain rights in this invention.

FIELD OF THE INVENTION

This application generally relates to transmitting information and more particularly to transmitting information over half-duplex erasure channels.

BACKGROUND OF THE INVENTION

As is known in the art, a network includes a plurality of processing sites generally referred to as stations or nodes connected by one or more physical or wireless and/or logical connections. When the connections establish transmission of a signal in one direction between the nodes, the connections are generally referred to as links. Each node typically performs a switching function and one or more additional functions.

In some network applications, nodes can transmit and receive, but cannot transmit and receive at the same time. In such applications, a sender in a link wants to transmit M data packets at a given link data rate R and the channel is modeled as a packet erasure channel. To transmit data packets at a desirable rate, network coding (also sometimes referred to as coded packet networks) may be used.

Network coding considers the nodes to have a set of functions that operate upon received or generated data packets. Today's networks would represent a subset of the coded packet networks, in which each node has two main functions: forwarding and replicating a packet. A classical network's task is to transport packets provided by the source nodes unmodified. In contrast, network coding considers information as an algebraic entity, on which one can operate.

Network coding research originally studied throughput performance without delay considerations for the transmitted information. Initial work in this area considered a channel with no erasures and, therefore, no need for feedback. Later work showed that linear codes over a network are sufficient to implement any feasible multicast connection, again considering a channel with no erasures. In both of these cases, the nodes are considered to transmit a linear combination of the packets previously received.

Still other systems utilize linear codes generated randomly in a network. It has been shown that such systems achieve multicast capacity in a non-erasure channel.

For networks with packet erasures, two approaches have been used. The first approach uses block transmissions. With respect to wireless networks, it has been shown that linear codes achieve capacity in the network. A second approach relies on rateless codes, i.e. transmitting coded data packets until a receiver sends an acknowledgement stating that all data packets have been decoded successfully.

It has also been shown that random linear network coding in lossy networks can achieve packet-level capacity for both single unicast and single multicast connections and for models of both wireline and wireless networks.

Still other systems utilize network codes that preserve the communication efficiency of a random linear code, while achieving better computational efficiency. Some prior art work presents a random linear coding scheme for packet streams considering nodes with a fixed, finite memory, establishing a trade-off between memory usage and achievable rate.

Some prior art references have studied delay performance gains and their scaling laws for network coding with and without channel side information, respectively. The focus of some of this work is on transmission of large files in a rateless fashion, i.e. minimal feedback to indicate that the information has been successfully decoded. In some references, the performance of network coding for a tree-based multicast problem is studied and compared to various Automatic Repeat reQuest (ARQ) and Forward Error Correcting (FEC) techniques. The expected number of transmissions per packet is used as the performance metric. For network coding, this reference assumes reliable and instantaneous feedback to acknowledge a correct decoding of all data packets. Note that the focus of these references has been on either throughput or delay performance, usually considering minimal feedback.

Finally, some prior art systems couple the benefit of network coding and ARQ by acknowledging degrees of freedom instead of original data packets to show that queue size in a node follows degrees of freedom.

SUMMARY OF THE INVENTION

In accordance with the concepts, systems and techniques described herein, a coding and queue management technique for communication networks that employ linear network coding, assuming full feedback is described. In particular, techniques related to channels in which time division duplexing is necessary (i.e. when a node can only transmit or receive, but not both at the same time are described). It is believed that this problem has not been considered in any of the previous network coding references or in prior network coding systems. This type of channel is often referred to as half-duplex in the literature, but the term time division duplexing (TDD) is used herein to emphasize that the transmitter and receiver do not use the channel half of the time each or in any pre-determined fashion. Important examples of time division duplexing channels are infrared devices (IrDA), which have motivated many TDD ARQ schemes and underwater acoustic communications. Other important applications may be found in channels with very high latency, e.g. in satellite and deep space communications. More specifically, the techniques described herein focus on the problem of transmitting M data packets through a half-duplex link using random linear network coding. The sender can transmit random linear coded packets back-to-back before stopping to wait for an acknowledgement packet (an ACK packet). This ACK packet conveys the remaining number of degrees of freedom (DOF), defined as linearly independent combinations of the data packets, required at the receiver to decode all M data packets. The technique described herein considers that the number of coded packets (denoted Ni) to be transmitted before waiting for a new ACK packet depends on the number of degrees of freedom (denoted i) needed at the receiver, as indicated by the last ACK packet received successfully. If it is the first transmission, the technique considers that the required number of DOFs is M.

In one embodiment, a system transmits a number (Ni) of coded packets (CP), and waits to receive an ACK packet that updates the value of i to another value (e.g. j), at which point the system transmits Nj coded packets. The system will keep transmitting and stopping to update the value of i, until i=0. When i=0, the transmitter can start with M new data packets, or simply stop.

In terms of mean completion time, (i.e. mean time to decode the M original data packets at the receiver and get an ACK at the transmitter) it has been found that there exists an optimal number of coded data packets to be transmitted back-to-back before stopping to wait for an ACK packet from the receiver. In fact, the optimal number of coded data packets Ni depends upon the number of DOFs (i) the receiver requires to decode the information, and also on the packet error probability and the latency, i.e. the number of bits in flight. Thus, it is shown that there is an optimal time at which to stop transmitting coded packets and at which to start listening to an ACK packet from the receiver.

One objective of the concepts, systems and techniques described herein is to reduce, or in some cases even minimize the expected time to complete transmission of a block, i.e. the delay in block transmissions, using feedback. This delay to decode a block is different from the usual packet delay measure. However, since coding is carried out on blocks of packets, the delay to decode a block successfully determines the delay of each of the packets in that block. It is also shown that minimizing the expected transmission time of a block of M packets with a fixed packet size also maximizes the throughput performance. However, it is shown that a correct choice of M and number of bits in the data packet can further improve throughput performance.

Although both standard ARQ techniques as well as the concepts, systems and techniques described herein achieve reliability by detecting errors in received packets or packet erasures, and recovering the information using a retransmission scheme, there are some important differences. First, the systems and techniques described herein rely upon transmission of coded packets, i.e. there is no need to specify a particular data packet to retransmit as in ARQ, but only a random linear combination. The ACK packet of the system and techniques described herein thus differs from common ARQ techniques in that the systems and techniques do not give acknowledgement to particular data packets, but to degrees of freedom needed at the receiver to decode the M original packets. Second, the number of coded packets transmitted in the systems and techniques described herein is not fixed by design of the algorithm, but rather is selected given channel characteristics and information in the ACK packet. In fact, the information in the ACK packet of the technique described herein can be used to update an estimate of the probability of packet error and improve the overall performance.

Accordingly, described herein is a random linear network coding system and related techniques for providing reliable communications for time division duplexing channels. In one embodiment, the system and techniques optimize the mean time to complete transmission of a number of data packets by determining the number of coded data packet that the sender has to transmit back-to-back before stopping to wait for the receiver to acknowledge how many degrees of freedom, if any, are required to decode correctly the information. It should be appreciated that metrics other than mean completion time could also be used. For example, the concepts, systems and techniques described herein may also be used to improve energy consumption or other system metrics (e.g. a system could be optimized to minimize energy consumption such as mean energy consumption). The system and techniques could be optimized for a metric deemed important to a particular application. One of ordinary skill in the art will appreciate which metric or metrics to optimize for a particular application.

In terms of mean completion time, the optimal number of coded data packets to be sent back-to-back depends upon a number of factors including, but not limited to, latency, probabilities of erasure of the coded packet and the ACK, and the number of degrees of freedom that the receiver requires to decode the data. While there is no closed form solution for the optimal number of packets, it is possible to perform a search of the optimal values. For example, the search method for the optimal value may be accomplished by exploiting the recursive characteristic of the problem, i.e. instead of making an M-dimensional search, M one-dimensional searches may be done.

In particular, in one embodiment, the computation of the optimal number of coded packets (because of the Markov property) can be accomplished, the values of all Ni's can be optimized in a recursive fashion, i.e. starting by N1, then N2 using the optimal value for N1 and so on, until NM, in order to minimize the mean completion time. As mentioned above, in one exemplary embodiment, the search for each optimal Ni may be performed by a one-dimensional integer search. For example: (1) computing the mean completion time for Ni integer in a range going from i to a large number, using the previously computed optimal values for Nj, j<I; and (2) finding the Ni that gives the minimum mean completion time in the range. Other search techniques (e.g. an M-dimensional search) may, of course, also be used.

It should also be appreciated that the values to be search and/or the values corresponding to an optimal number of packets need not to be computed in real time. Rather, the values can be pre-computed and stored in the receiver as look-up tables. This procedure makes the computational load on the nodes to be negligible at the time of determining the optimal transmission time.

Also described is an analysis and numerical results that show that transmitting the optimal number of coded data packets sent before stopping to listen for an ACK provides performance very close to that of a network coding scheme operating in a full-duplex channel, in terms of mean time to complete transmission of all packets. This is the case even in high latency channels. Choosing a number different from the optimum can cause a large degradation in performance, especially if latency and/or packet error probability are/is high.

Since random linear network coding is used, the results of the concepts, systems and techniques described herein can be extended to the case of a network in which each node performs a random linear combination of packets received from different nodes. In this extension, each node transmitting through a link, or, more generally, a so-called "hyperarc" will have an optimal number of coded packets to transmit back-to-back before stopping to listen.

DETAILED DESCRIPTION OF THE PREFERRED EMBODIMENTS

Figure 1:
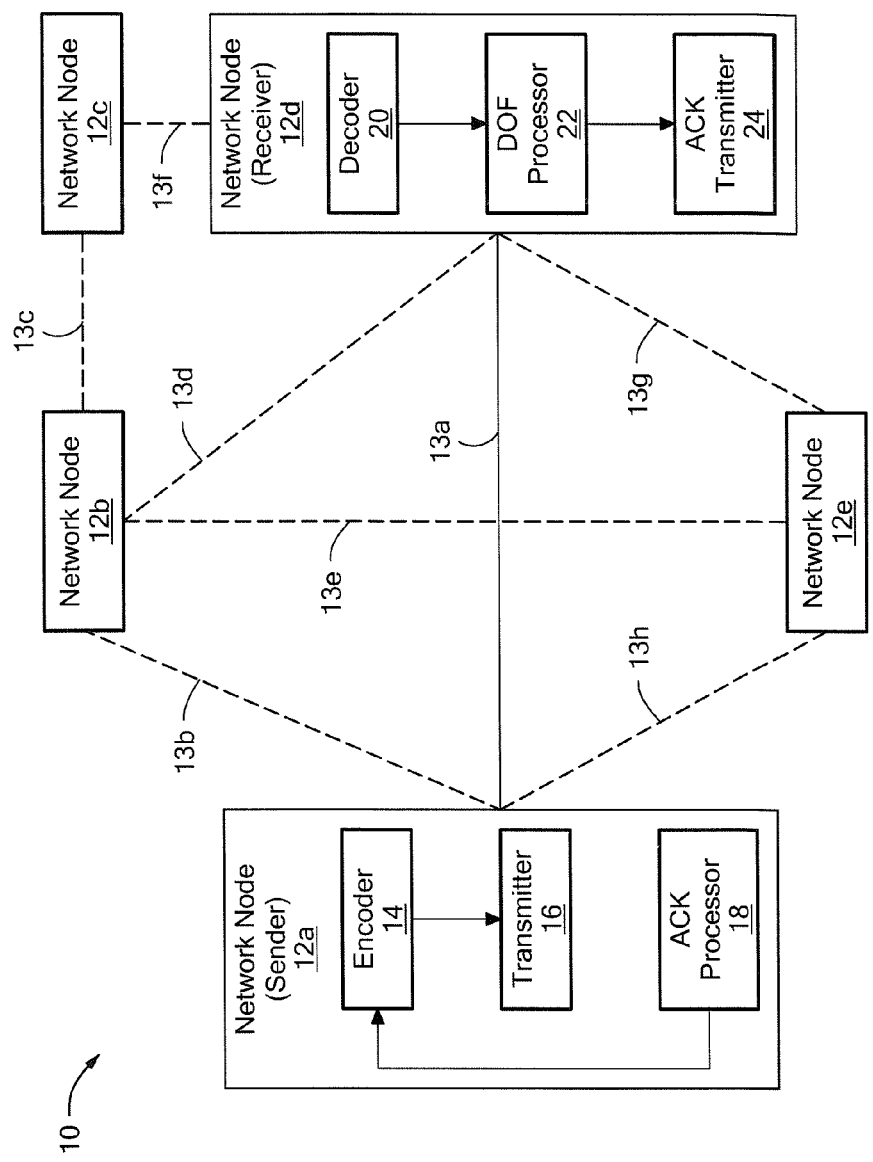
FIG. 1. is a block diagram of a network having at least one channel which utilizes time division duplexing (TDD) between a sender node and a receiver node.

Referring now to FIG. 1, a network 10 includes a plurality of stations or nodes 12a-12e generally denoted 12. Nodes 12 can be coupled as shown through channels or links 13a-13h generally denoted 13. As used herein the term "link" may refer to a physical or a wireless connection between two nodes. It should be noted that, although not illustrated in FIG. 1, it is possible for a separate link to exist between each of the nodes 12a-12e in the network. For example, a separate link may be provided from node 12a to each of nodes 12b-12e. Owing to cost considerations, physical construction limitations, technological limitations and other considerations, however, separate physical links are not always provided between each of the nodes 12a-12e.

In the exemplary network 10, nodes 12a and 12d are coupled via link 13a. In this exemplary embodiment, nodes 12a, 12d can only transmit or receive, but not both, at the same time. Thus, link 13a corresponds to a link in which time division duplexing (TDD) is necessary.

TDD channels are also referred to as half-duplex channels, however the term time division duplexing is used herein to emphasize that the transmitter and receiver do not use the channel half of the time each or in any pre-determined fashion. Some examples of time division duplexing channels are infrared devices (IrDA), which have motivated many TDD ARQ schemes, and underwater acoustic communications. Other important applications may be found in channels with very high latency, including but not limited to satellite, and deep space communications. Thus, it should be appreciated that the concepts, systems and techniques described herein find use in a wide variety of different applications which make use of time division duplexing channels including but not limited to infrared devices, underwater acoustic communications and/or in applications having high latency including but not limited to satellite and deep space communications.

In the exemplary embodiment of FIG. 1, node 12a is designated as a sending node (also referred to herein as a "transmitting node" or a "transmitter node" or more simply a "sender") indicating that node 12a wants to transmit (or send) a predetermined number of data packets (in this exemplary embodiment, M data packets) to node 12d which is designated herein as a receiving node (also referred to herein as a "receiver node" or more simply a "receiver") through link 13a using random linear network coding. It should, of course, be understood that in some applications any of nodes 12a-12e in a network may be designated as sender and/or receiver nodes. Thus in some embodiments each node in the network must be able to perform the necessary functions of both sender and receiver nodes. In other embodiments, only certain nodes need be able to perform the send function and certain nodes need be able to perform the receive function.

In the exemplary embodiment described herein, sender 12a can transmit random linear coded packets back-to-back before stopping to wait for an acknowledgement (ACK) packet from receiver 12d. Once sender 12a stops sending packets, receiver 12d transmits an ACK packet to sender 12a. The ACK packet provided by receiver 12d conveys the remaining number of degrees of freedom (DOF), defined as linearly independent combinations of the data packets, required at receiver 12d to decode all M data packets. In the technique described herein, the number of coded packets Ni to be transmitted before waiting for a new ACK packet depends upon the number of DOFs (i) needed at receiver 12d, as indicated by the last successfully received ACK packet. In one preferred embodiment, if it is the first transmission of a sender node (e.g. sender node 12a), the required DOFs is selected to be M. In other embodiments, the initial selection may be different than M.

It should be appreciated that in some applications, a physical connection (e.g., a fiber optic cable) may connect two nodes, however, there may be no preferred logical connection between the two nodes despite the existence of the physical connection. That is, the preferred path between the two nodes (e.g. nodes 12a and 12d) may involve a third node (e.g. node 12e) and corresponding links to the third node rather than the direct link (i.e. link 13a) between the two nodes (i.e. nodes 12a, 12d). For example, if direct link 13a between nodes 12a, 12d is deemed too unreliable to use, then it may be desirable to not transmit information or other signals such as data, voice or power signals across this link. In this case, the path between nodes 12a and 12d would involve node 12e and links 13g, 13h and it should be appreciated that the concepts and techniques described herein can still be used (i.e. the concepts and techniques described herein can still be used even when only predetermined logical connections are made among the nodes 12a-12e).

In general overview and taking network node 12a as representatives of sender nodes, network node 12a comprises an encoder 14, a transmitter 16 and an acknowledgment processor 18. Encoder 14 encodes data packets and provides the data packets to a transmitter which transmits the coded data packets over link 13 to receiving node 12e. One particular manner in which encoder 14 encodes packets will be described in detail below. Briefly, however, if it is desired to transmit M data packets from sender 12a to receiver 12e and if it is the first transmission, then encoder 14 encodes $N_M$ data packets and transmitter 16 transmits the random linear coded packets to receiving node 12e back-to-back over channel 13 before stopping to wait for an acknowledgement (ACK) packet from receiving node 12e.

Similarly, taking network node 12d as representatives of all receiver nodes, network node 12d comprises a decoder 20, a DOF processor 22 and an acknowledgment transmitter 24. Receiving node 12d receives the coded packets in decoder 20 which decodes the packets and based upon the number of packets successfully received, DOF processor 22 determines the remaining number of DOFs (defined as linearly independent combinations of data packets) required at receiver node 12d to decode all M data packets.

Acknowledgement transmitter 24 then transmits an acknowledgement packet (ACK packet) to sender 12a. This ACK packet conveys to sender 12a the remaining number of DOFs (i) required at receiver node 12d to decode all M data packets.

It should be appreciated that the number of coded packets Ni to be transmitted before waiting for a new ACK packet depends upon the number of DOFs i needed at the receiver, as indicated by the last ACK packet received successfully.

As will become apparent form the description provided herein below, there exists an optimal number of coded data packets to be transmitted back-to-back by sender 12a before stopping to wait for an ACK packet from receiver 12d, in terms of mean completion time (i.e. mean time to decode the M original data packets at the receiver and get an ACK at the transmitter). In fact, an optimal number of coded data packets Ni depends upon the number of DOFs (i) a receiver requires to decode the information, and also on the packet error probability and the latency, i.e. the number of bits in flight. Thus, there exists an optimal time at which to stop transmitting at sender node 12a coded packets and at which to start listening for an ACK packet from receiver node 12d.

In one embodiment, the system can be optimized to minimize the expected time to complete transmission of a block, (i.e. the delay in block transmissions), using feedback. This delay to decode a block is different from the usual packet delay measure. However, since coding is carried out on blocks of packets, the delay to decode a block successfully determines the delay of each of the packets in that block.

In accordance with the concepts, systems and techniques described herein, it has been found that minimizing the expected transmission time of a block of M packets with a fixed packet size also maximizes the throughput performance. However, it can be shown that a correct choice of M and number of bits in the data packet, can further improve throughput performance.

It should be appreciated that although both standard ARQ systems and techniques and the systems and techniques described herein achieve reliability by detecting errors in received packets or packet erasures, and recover the information using a retransmission scheme, there are some important differences. First, the systems and techniques described herein rely on transmission of coded packets. That is, there is no need to specify a particular data packet to retransmit as in ARQ, but only a random linear combination. The ACK packet of the systems and techniques described herein thus differ from common ARQ systems and techniques in that it does not give acknowledgement to particular data packets, but to degrees of freedom needed at the receiver to decode the M original packets. Second, the number of coded packets transmitted in the systems and techniques described herein is not fixed by design of the algorithm, but rather is selected in accordance with given channel characteristics and information in the ACK packet. In fact, the information in the ACK packet generated by the system and techniques described herein can be used to update an estimate of the probability of packet error and improve the overall performance.

It should, of course, be appreciated that in some applications it may be desirable to optimize a measure other than expected time to complete transmission of a block. For example, it may instead be desirable to optimize a measure such as a mean time to complete transmission of a block of packets to all receivers in a which uses random linear network coding for broadcasting in TDD channels. Other measures, may of course, also be used. For example, a mean completion energy measure could be used.

Also in accordance with the concepts, systems and techniques described herein, it has been found that transmitting the optimal number of coded data packets sent before stopping to listen for an ACK packet provides performance very close to that of a network coding scheme operating in a full-duplex channel, in terms of mean time to complete transmission of all packets. This is the case even in high latency channels. Choosing a number different from the optimum can cause a large degradation in performance, especially if latency is high.

Figure 1A:
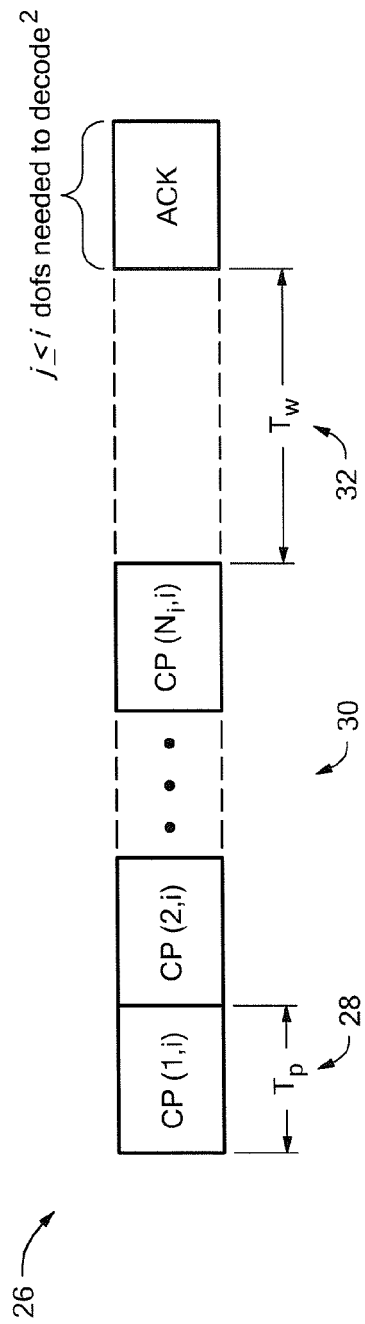
FIG. 1A is a block diagram which illustrates a network coding TDD scheme.

Referring now to FIG. 1A, a coded packet 26 denoted as CP(k, d) represents the k-th coded packet upon starting transmission (e.g. at sender node 12a in FIG. 1) with d DOFs needed at a receiver (e.g. receiving node 12d in FIG. 1) to decode the information. Thus, FIG. 1A illustrates a communication process suitable for use in a network having a TDD link such as network 10 described above in conjunction with FIG. 1.

As discussed above, a sender transmits Ni coded packets (CP) to a receiver and waits to receive from the receiver an ACK packet that updates a value corresponding to a number of degrees of freedom required at the receiver to decode all of the data packets (e.g. from a value of i to j), at which point the sender will transmit Nj coded packets. The sender will keep transmitting and stopping to update a value corresponding to an number of degrees of freedom required at the receiver to decode all of the data packets until an indication is given that number of degrees of freedom required at the receiver to decode all of the data packets is equal to zero (e.g. i=0). When number of degrees of freedom required at the receiver to decode all of the data packets is equal to zero, the sender can start with M new data packets, or simply stop.

Figure 1B:
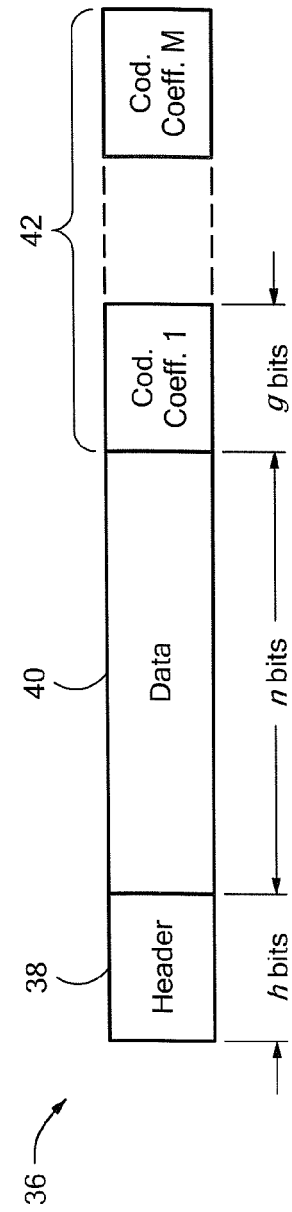
FIG. 1B is a block diagram which illustrates an exemplary structure for a coded data packet.

Referring now to FIG. 1B, a sender uses random linear network coding to generate a coded data packet 36. Each coded data packet contains a linear combination of the M data packets 40 of n bits each, as well as random encoding vectors 42 used in the linear combination. Each vector 42 is represented by g bits. Thus, for encoding over a field size q, the number of bits may be computed as g=log 2 q bits.

Packet 36 also includes an information header 38 of size h bits. Thus, the total number of bits per packet is h+n+gM. FIG. 1B shows an exemplary embodiment of a structure of each coded packet which may be used in accordance with the concepts, systems and techniques described herein.

As mentioned above, the sender can transmit coded packets back-to-back before stopping to wait for the ACK packet. The ACK packet feeds back the number of degrees of freedom, that are still required to decode successfully the M data packets. Since random linear coding is used, there is some probability of choosing encoding vectors that are all zero for one coded packet or encoding vectors that are linearly dependent on vectors of previously received packets. Thus, using arguments similar to [6], the expected number of successfully received packets before having M linearly independent combinations, is given by Equation (1) below:

$$\sum_{k=1}^{M} \frac{1}{(1-(1/q)^k)} \le M \frac{q}{q-1} \quad (1)$$

Figure 2:
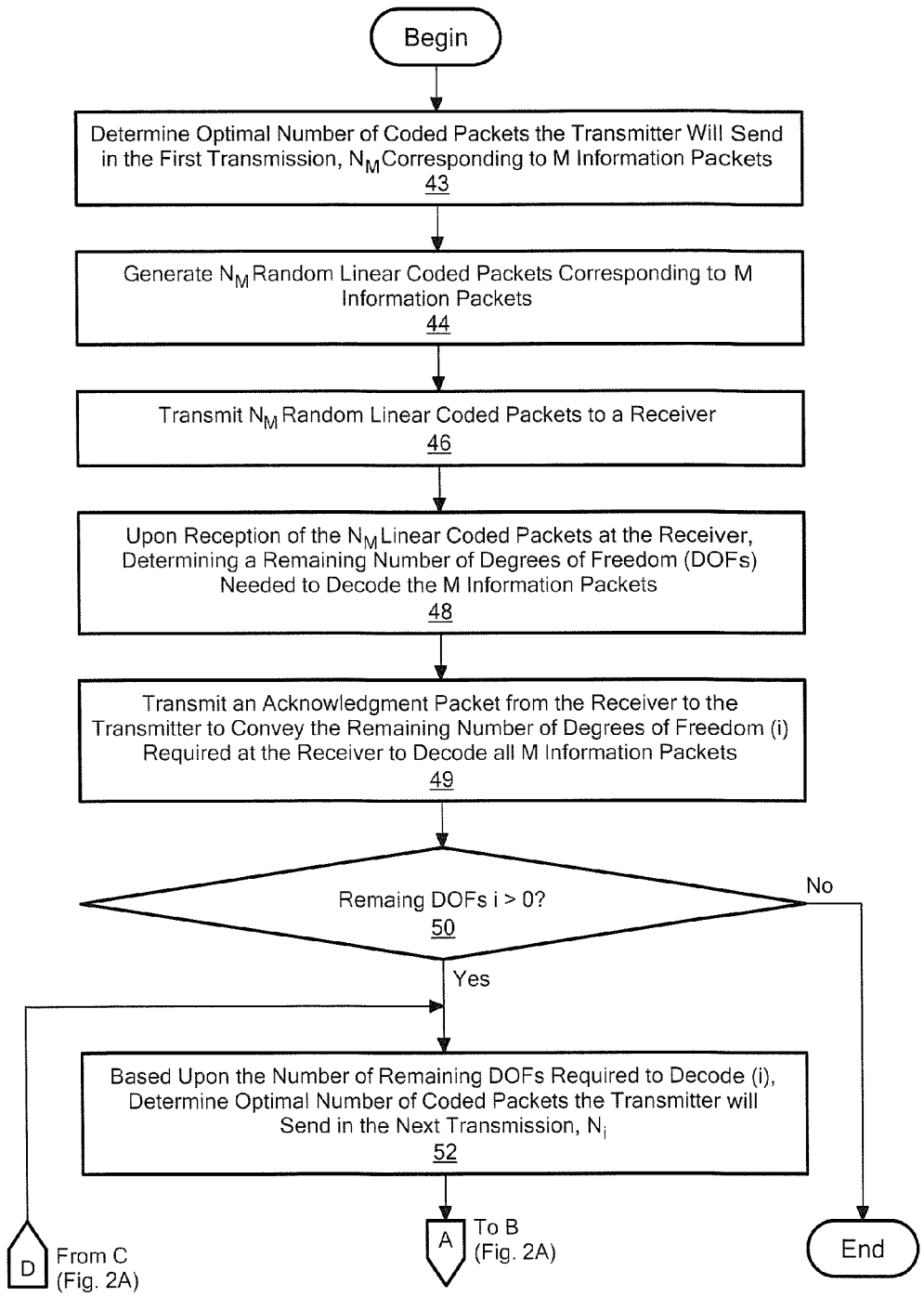
FIGS. 2 and 2A form a flow diagram which illustrates processing which takes place to transmit M coded packets from a sender node to a receiver node.
Figure 2A:
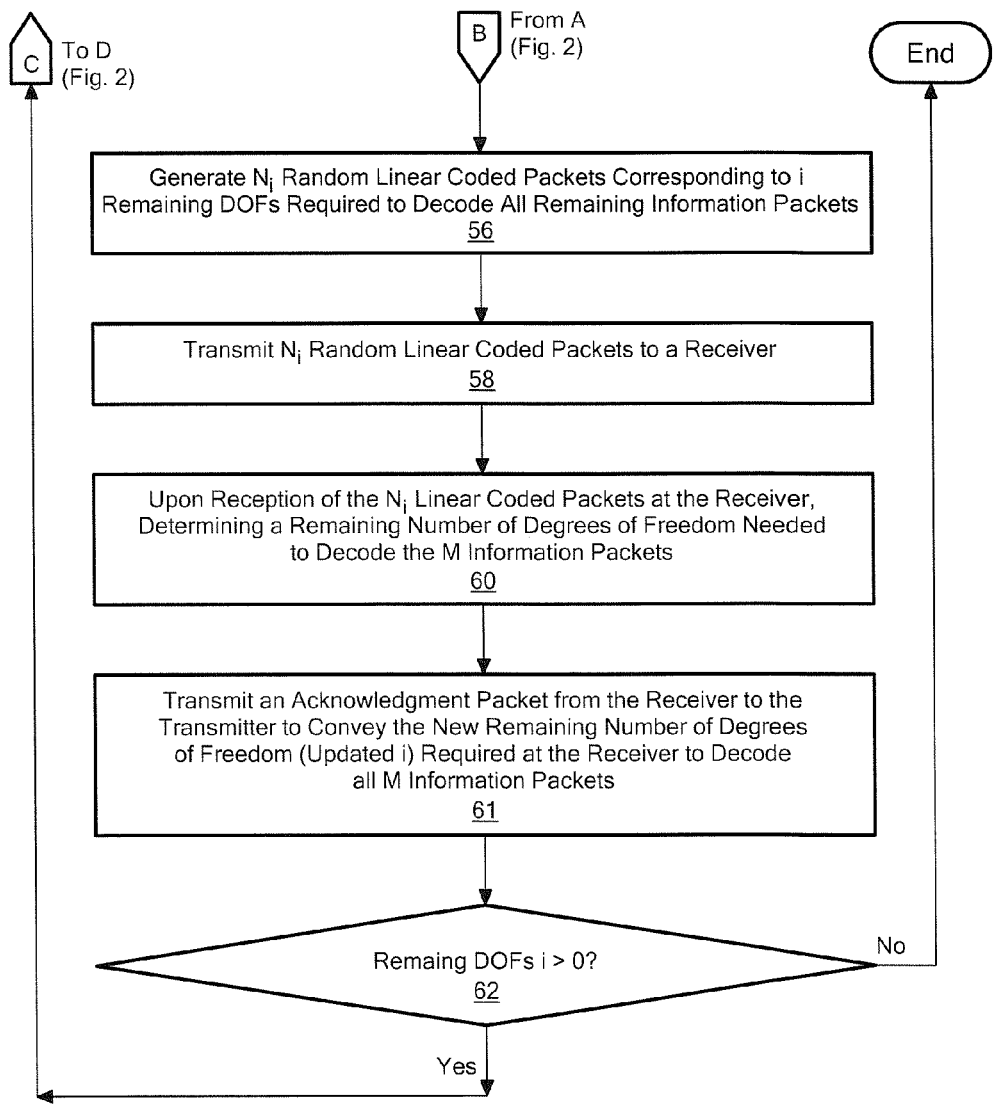
Figure 3:
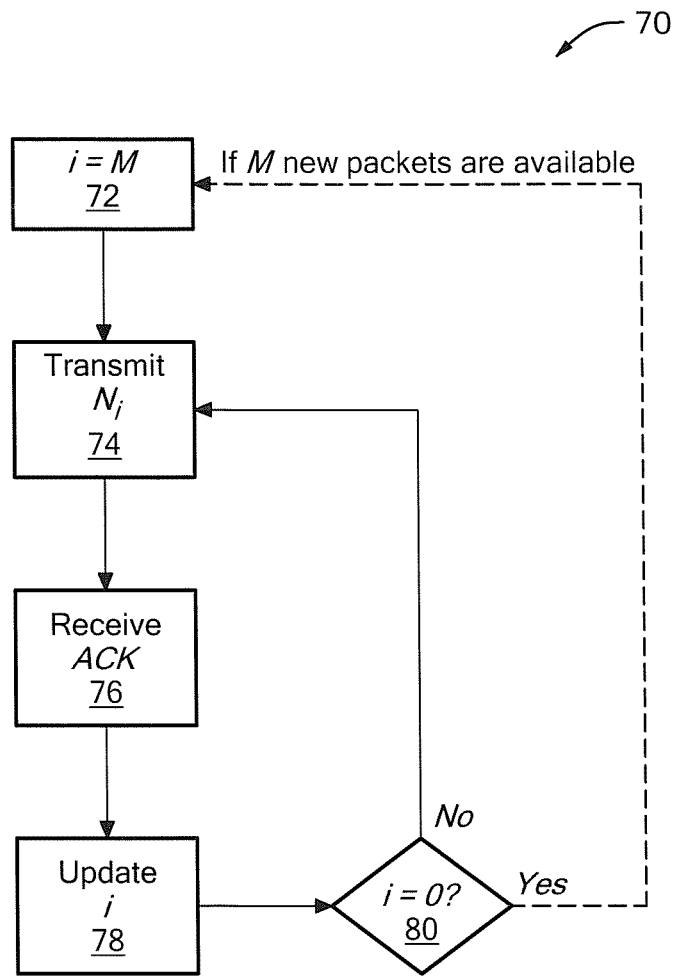
FIG. 3 is a flow diagram which illustrates processing which takes place to transmit M coded packets from a sender node to a receiver node.

FIGS. 2, 2A and 3 correspond to a flow diagram which shows the processing performed by a processing apparatus which may, for example, be provided as part of a node 12 (FIG. 1) to enable transmission data packets between a sender node and a receiver node. The rectangular elements (typified by element 43 in FIG. 2), are herein denoted "processing blocks" and represent computer software instructions or groups of instructions. The diamond shaped elements (typified by element 50 in FIG. 2A), are herein denoted "decision blocks" and represent computer software instructions, or groups of instructions which affect the execution of the computer software instructions represented by the processing blocks.

Alternatively, the processing and decision blocks represent steps performed by functionally equivalent circuits such as a digital signal processor (DSP) circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that, unless otherwise indicated herein, the particular sequence of steps described is illustrative only and can be varied without departing from the spirit of the invention.

Turning now to FIGS. 2 and 2A, in processing block 43 an optimal number of coded packets $N_M$ (corresponding to M information packets) a transmitter (or sender) will send in a first transmission between the sender and a receiver is determined.

Processing then proceeds to processing block 44 in which a node generates $N_M$ random linear coded packets corresponding to M information packets and then, as shown in processing block 46, the packets are transmitted to a receiver node.

As shown in processing block 49, upon reception of the $N_M$ random linear coded packets at the receiver node, the receiver node determines a remaining number of degrees of freedom needed to decode the M information packets. The receiver node then transmits an acknowledgment packet to the transmitter to convey the remaining number of degrees of freedom needed by the receiver to decode the M information packets.

In decision block 50, if the remaining number of degrees of freedom needed by the receiver to decode the M information packets is equal to zero, then this means that the receiver can decode the M information packets. In this case, processing of that particular group/batch of packets ends and the receiver is then available to process new information packets. If the remaining number of degrees of freedom needed by the receiver to decode the M information packets is greater than zero, then processing proceeds to processing block 52 in which the optimal number of coded packets the transmitter will send in the next transmission is determined based upon the remaining number of degrees of freedom (i) needed by the receiver to decode the M information packets.

Processing then proceeds to processing blocks 56 and 58 in which a node generates $N_i$ random linear coded packets corresponding to i remaining degrees of freedom needed by the receiver to decode all remaining information packets and then transmits the $N_i$ random linear coded packets to the receiver.

Processing then proceeds to processing block 60 in which, upon reception of the $N_i$ random linear coded packets at the receiver node, the receiver node determines a remaining number of degrees of freedom needed to decode remaining information packets. As shown in processing block 61, the receiver node transmits an acknowledgment packet to the transmitter to convey the remaining number of degrees of freedom needed by the receiver to decode the M information packets.

Decision block 62 implements a loop in which processing blocks 52-61 are repeated until there are no remaining degrees of freedom needed by the receiver to decode the M information packets. Once the number of remaining degrees of freedom needed by the receiver to decode the M information packets is equal to zero, then this means that the receiver can decode the M information packets. In this case, processing of that particular packet ends and the receiver is then available to process new information packets.

In the following analysis, it is assumed that the field size q is large enough so that the expected number of successfully received packets at the receiver, in order to decode the original data packets, is approximately M. This is not a necessary assumption for the analysis. It should be noted that one could have included the probabilities of receiving linearly independent combinations into the transition probabilities. However, making this assumption simplifies the expressions and provides a good approximation for large enough q.

It is desirable to determine the optimal number of coded packets that should be sent back-to-back before waiting for an ACK packet from the receiver in order to minimize the time for successfully transmitting the M data packets over the link.

Note that if M packets are in the queue, at least M degrees of freedom have to be sent in the initial transmission, i.e. $N_M \leq M$ coded packets. However, it is desirable to determine not only the number of DOFs that are required at the first transmission, but also at subsequent stages. Transmission begins with M information packets, which are encoded into $N_M$ random linear coded packets and transmitted. If all M packets are decoded successfully, the process is completed. Otherwise, the ACK informs the transmitter how many are missing, say i. The transmitter then sends Ni coded packets, and so on, until all M packets have been decoded successfully. In this case, it is desirable to know the optimal number Ni of coded packets to be transmitted back-to-back in the next transmission to complete the remaining i DOF's.

FIG. 3 shows the communication process as a system (e.g. a network node) initially transmits $N_M$ coded packets 72, 74 and awaits reception of an ACK packet 76 that updates a value i corresponding to a number of degrees of freedom needed at the receiver to decode all M information packets as shown in processing block 78. At this point the system transmits Ni coded packets. Blocks 74-80 implement a loop in which the system will keep transmitting and stopping to update i, until i=0. When i=0, the transmitter can start with M new data packets (i.e. return to block 72) or simply stop.

Figure 4:
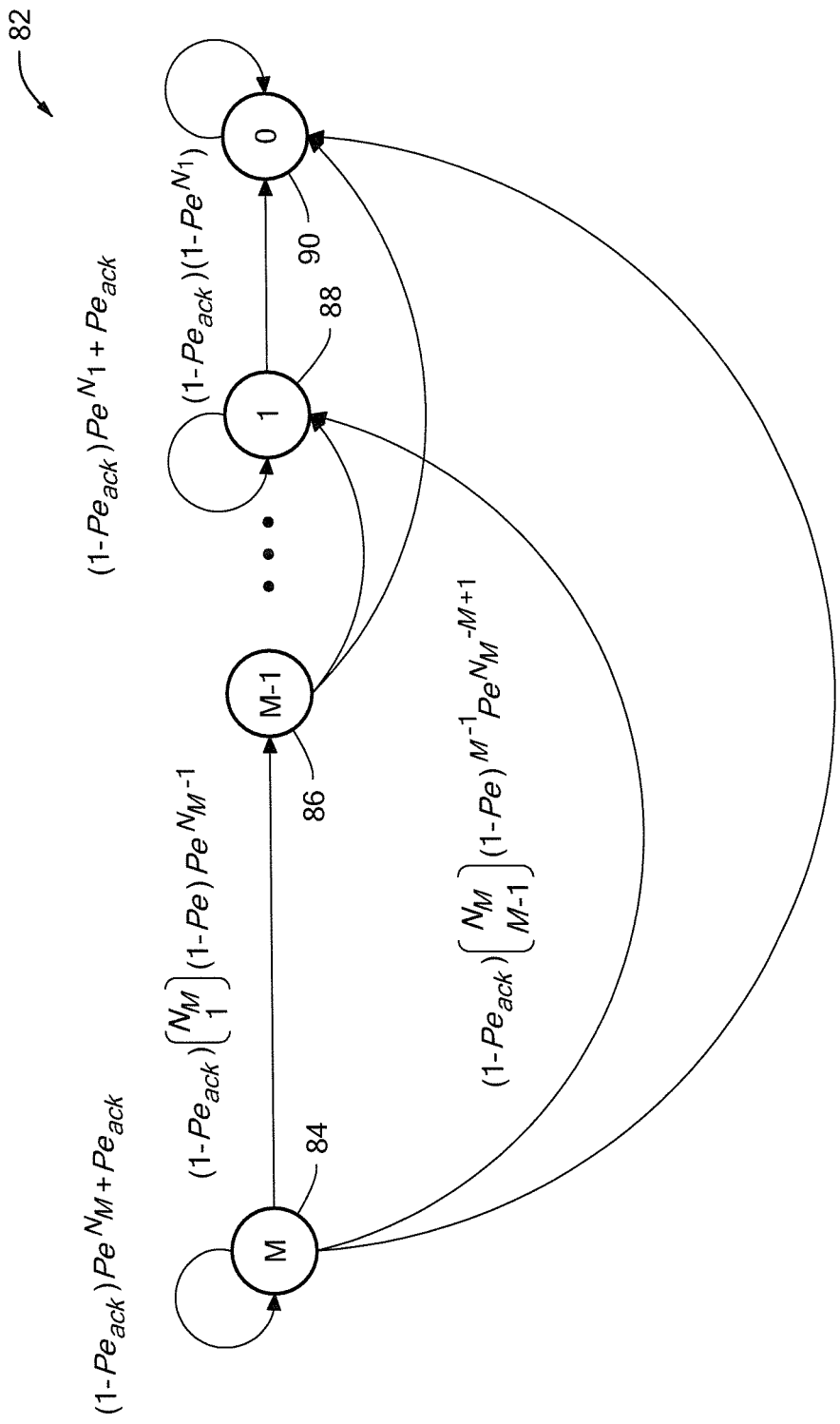
FIG. 4 is a Markov chain representation of the scheme in which state i represents that the receiver requires i more successfully received coded packets to decode the information.

Referring now to FIG. 4, the process can be modeled as a Markov Chain. States 84-90 are defined as the number of DOF's required at a receiver to decode successfully the M packets. Thus, as shown in FIG. 4, these states 84-90 range from M to 0. This is a Markov Chain with M transient states and one recurrent state (state 0) 90. Ni can be defined as the number of coded packets that are sent when i DOF's are required at the receiver in order to decode the information.

Note that the time spent in each state depends on the state itself, because $N_i \neq N_j, \forall \neq j$ in general.

The transition probabilities from state i to state j ($P_{i \to j}$) have the following expression for $0 \leq j < i$ and $N_i \geq i$:

$$P_{i \to j} = (1 - Pe_{ack}) \binom{N_i}{i-j} (1-Pe)^{i-j} Pe_i^{N-i+j} \quad (2)$$

where Pe and $Pe_{ack}$ represents the erasure probability of a coded packet and of an ACK packet, respectively.

More generally, the transition probability can be defined for any value of $Ni \geq 1$ as follows:

$$P_{i \to j}(1-Pe_{ack})f(i,j)(1-Pe)^{i-j}Pe_i^{N-i+j} \quad (3)$$

Where $$F(i, j) = \begin{cases} \binom{N_i}{i-j} & \text{if } N_i \geq i, \\ 0 & \text{otherwise} \end{cases} \quad (4)$$

For $j=i$ the expression for the transition probability reduces to:

$$P_{i \to j} = (1 - Pe_{ack})Pe^{N_i} + Pe_{ack} \quad (5)$$

The expected time for completing the transmission of the M data packets constitutes the expected time of absorption, i.e. the time to reach state 0 for the first time, given that the initial state is M. This can be expressed in terms of an expected time for completing the transmission given that the Markov Chain is in state i, $T_i$, $\forall_i = 0, 1, \ldots M-1$. Denoting the transmission time of a coded packet as $T_p$, and the waiting time to receive an ACK packet as $T_w$, then for the system and technique described herein, $T_p = (h+n+gM)/R$ and $T_w = T_{rt} + T_{ack}$, where $T_{ack} = n_{ack}/R$, where $n_{ack}$ is the number of bits in the ACK packet, R is the link data rate, and $T_{rt}$ is the roundtrip time. Note that $T_0 = 0$. Then, for $i > 1$:

$$T_i = \frac{N_i T_p + T_w}{(1 - Pe_{ack})(1 - Pe^{N_i})} \quad (6)$$

$$+ \frac{(1-Pe)^i Pe^{N_i - i} \sum_{j=1}^{i-1} f(i, j) \left(\frac{Pe}{1-Pe}\right)^j T_j}{1 - Pe^{N_i}} \quad (7)$$

For example, for $i=1$:

$$T_1 = \frac{N_1 T_p + T_w}{(1 - Pe_{ack})(1 - Pe^{N_1})} \quad (8)$$

As can be seen, the expected time for each state i depends upon all of the expected times for the previous states. Because of the Markov property, the values of all $N_i$'s can be optimized in a recursive fashion, i.e. starting by $N_1$, then $N_2$ and so on, until $N_M$, in order to minimize the expected transmission time. This is described below.

An objective is to reduce, and if possible, minimize the value of the expected transmission time $T_M$. Under the assumption that $N_i \geq i$, Equation 9 results:

$$\min_{N_M, \ldots, N_1} T_M = \min_{N_M, \ldots, N_1} \frac{N_M T_p + T_w}{(1 - Pe_{ack})(1 - Pe^{N_M})} + \quad (9)$$

$$\frac{(1-Pe)^M Pe^{N_M - M} \sum_{j+1}^{M-1} \binom{N_M}{M-j}\left(\frac{Pe}{1-Pe}\right)^j T_j}{1 - Pe^{N_M}}$$

$$= \min_{N_M} \frac{N_M T_P + T_W}{(1 - Pe_{ack})(1 - Pe^{N_M})} + \quad (10)$$

$$\frac{(1-Pe)^M Pe^{N_M - M} \sum_{j=1}^{M-1} \binom{N_M}{M-j}\left(\frac{Pe}{1-Pe}\right)^j \min_{N_j, \ldots, N_1} T_j}{1 - Pe^{N_M}}$$

Without this assumption, we have:

$$\min_{N_M, \ldots, N_1} T_M = N \min_{N_M, \ldots, N_1} \frac{N_M T_p + T_w}{(1 - Pe_{ack})(1 - Pe^{N_M})} + \quad (11)$$

$$\frac{(1-Pe)^M Pe^{N_M - M} \sum_{j=1}^{M-1} f(M, j)\left(\frac{Pe}{1-Pe}\right)^j T_j}{1 - Pe^{N_M}}$$

$$= \min_{N_M} \frac{N_M T_p + T_w}{(1 - Pe_{ack})(1 - Pe^{N_M})} + \quad (12)$$

$$\frac{(1-Pe)^M Pe^{N_M - M} \sum_{j=1}^{M-1} f(M, j)\left(\frac{Pe}{1-Pe}\right)^j \min_{N_j, \ldots, N_1} T_j}{1 - Pe^{N_M}}$$

Hence, regardless of the assumption on $N_i$, the problem of minimizing $T_M$ in terms of the variables $N_M, \ldots, N_1$ can be solved iteratively. First, one computes $\min_{N_1} T_1$, then uses this result in the computation of $\min_{N_2, N_1} T_2$, and so on. One approach to computing the optimal values of $N_i$ is to ignore the constraint to integer values and take the derivative of $T_i$ with respect to $N_i$ and look for the value that sets it equal to zero. For the particular problem described herein, this approach leads to solutions without a closed form, i.e. expressed as an implicit function. For M=1, the optimal value of $N_1$ can be expressed using a known implicit function (Lambert function), and it is given by $$N_1^* = \frac{1 + W\left(-\exp\left(-1 + \frac{\ln(P_e)T_w}{T_p}\right)\right)}{\ln Pe} - \frac{T_w}{T_p} \quad (13)$$

where $W(\bullet)$ is the Lambert W function. The positive values are found for the branch $W_{-1}$ using conventional techniques.

The case of M=1 can be thought as an optimized version of the uncoded Stop-and-Wait ARQ. Instead of transmitting one packet and waiting for the ACK, the analysis presented herein suggests that there is an optimal number of back-to-back repetitions of the same data packet that should be transmitted before stopping to listen for an ACK packet. Instead of using the previous approach, a search of the optimal values $N_i$, $\forall i \in \{1, \ldots M\}$, using integer values is performed. Thus, $N_i$s can be computed numerically for given Pe, $Pe_{ack}$, $T_w$ and $T_p$. In particular, the search method for the optimal value can be made much simpler by exploiting the recursive characteristic of the problem, i.e. instead of making an M-dimensional search, M one-dimensional searches can be performed. Finally, these $N_i$ need not be computed in real time. They can be pre-computed and store in the receiver as look-up tables. This procedure reduces the computational load on the nodes at the time of transmission.

Considering the same setting, i.e. a fixed number of packets M that have to be transmitted to the receiver, but with a fixed, pre-determined maximal number of coded packets to be transmitted before stopping to listen, the maximal value of coded packets can be defined as ω. If the number of degrees of freedom i required at the receiver to decode the information is $i \geq \omega$, the transmitter will transmit ω degrees of freedom. If $i < \omega$, the transmitter will transmit i degrees of freedom.

The model for the Markov Chain is derived from the previous case, by setting $N_i = \omega$, $\forall i \geq \omega$ and $N_i = i$, $\forall i < \omega$. For $i \geq \omega$, it follows that:

$$T_i = \frac{\omega T_p + T_w}{(1 - Pe_{ack})(1 - Pe^\omega)} \quad (14)$$

$$+ \frac{\sum_{j=1}^{\omega} \binom{\omega}{j}(Pe^{\omega-j}(1-Pe^j)T_{i-j}}{1 - Pe^\omega} \quad (15)$$

and for $i<\omega$:

$$T = \frac{iT_p + T_w}{(1 - Pe_{ack})(1 - Pe^i)} \quad (16)$$

$$+ \frac{\sum_{j=1}^{i} \binom{i}{j}(Pe^{i-j}(1-Pe^j)T_{i-j}}{1 - Pe^i} \quad (17)$$

A comparison of the system and techniques described herein with an optimal full-duplex ARQ scheme is next described. An optimal full-duplex ARQ scheme assumes that nodes are capable of receiving and transmitting information simultaneously, and in that sense it is optimal in light of minimal delay. The sender transmits coded packets back-to-back until an ACK packet for correct decoding of all information (M information packets) has been received. This scheme can be modeled as a Markov Chain where, as before, the states represent the number of DOFs received. The time spent in each state is the same ($T_p$). Once the M packets have been decoded, i.e. M DOFs have been received, the receiver transmits ACK packets back-to-back, each of duration $T_{ack}$. One ACK should suffice but this procedure reduces or in some cases even minimizes the effect of a lost ACK packet.

The mean time to complete the transmission and get an ACK packet for the optimal full duplex ARQ scheme may be computed as:

$$E[T] = T_n - \frac{MT_p}{1 - Pe} + \frac{T_{ack}}{Pe_{ack}} \quad (18)$$

The mean throughput should be defined as E[Mn/T], which is MnE[1/T] if Mn is deterministic. For the case of M=1, i.e. the extended version of the Stop-and-Wait ARQ scheme, a simple expression for the mean throughput in terms of the transition probabilities $P_{1\to1}$ and $P_{1\to0}$, can be provided:

$$E\left[\frac{1}{T}\right] = \frac{P_{1\to o}}{P_{1\to 1}} \sum_{k=1}^{\infty} \frac{P_{1\to 1}^k}{k(N_1 T_p + T_w)} \quad (19)$$

$$= \frac{P_{1\to o}}{P_{1\to 1}(N_1 T_p + T_w)} \sum_{k=1}^{\infty} \frac{(1 - P_{1\to 0})^k}{k} \quad (20)$$

$$= \frac{P_{1\to o}}{P_{1\to 1}(N_1 T_p + T_w)} \ln(P_{1\to 0}) \quad (21)$$

The Mercator series has been used since $|1-P_{1\to 0}|<1$ for all cases of interest. However, for M>1 the expressions are complicated. Thus, the measure of throughput $\eta$, is defined as the ratio between number of data bits transmitted (n) and the time it takes to transmit them. For the case of a block-by-block transmission, as described above, the measure of throughput $\eta$ may be expressed as:

$$\eta = \frac{Mn}{T_M} \quad (22)$$

where $T_M$ is the expected time of completion defined previously.

It should be noted that the expected throughput and the measure of throughput $\eta$ are not equal. For the case of M=1, note that $E[Mn/T]=\eta(\ln(1/P_{1\to 0}))/P_{1\to 1}$.

More generally, using Jensen's inequality, MnE[1/T] $\geq Mn/T_M$ for T>0. Therefore, the measure of throughput $\eta$ constitutes a lower bound to the mean throughput in the novel system and techniques described herein. Another reason to consider this measure is to compare the novel network coding scheme described herein with typical ARQ schemes that do not rely on coded packets since the analysis for most ARQ schemes is performed using $\eta$.

It should be noted that if the number of packets M and the number of bits n are fixed, the measure of throughput $\eta$ is maximized as $T_M$ is minimized. Thus, by minimizing the mean time to complete transmitting of a block of M data packets with n bits each, the measure of throughput $\eta$ is also being maximized for those values. However, it can be shown that the maximal measure of throughput $\eta$ should be obtained using the number of packets M and the number of bits in each packet n as arguments in the optimization technique described herein.

This is significant for systems in which the data is streamed. In that case, the novel system and techniques described herein provide a way to optimally divide data into blocks of packets before starting communication.

Next described is selection of optimal packet size and packets per block. Throughput with a pre-determined choice of the number of data bits n and the number of data packets M in each block has been discussed above. However, expression 22 above implies that the throughput $\eta$ depends upon both the number of bits per packet n and the number of packets M. Hence, it is possible to choose these parameters so as to maximize the throughput. This problem can be approached in several ways. The first approach is to look for the optimal measure of throughput $\eta$ while keeping the number of packets M fixed:

$$\eta_{opt}(M) = \operatorname*{arg\,max}_{n} \left\{ \max_{N_M, \ldots N_1} \eta \right\} \quad (23)$$

The second approach is to look for the optimal number of packets M while keeping the number of bits per packet n fixed:

$$\eta_{opt}(n) = \operatorname*{arg\,max}_{M} \left\{ \max_{N_M, \ldots N_1} \eta \right\} \quad (24)$$

More generally, one could consider the case in which both parameters are variable and there is interest in maximizing the measure of throughput $\eta$:

$$\eta_{opt} = \operatorname*{arg\,max}_{n, M} \left\{ \max_{N_M, \ldots N_1} \eta \right\} \quad (25)$$

Described in conjunction with FIGS. 5-9 are numerical examples that compare the performance of the different network coding schemes discussed above in TDD channels. The comparisons are carried out in terms of the mean time to complete a transmission of M data packets through TDD channels under different block error probabilities. Also presented are results in terms of the measure of throughput η to illustrate its dependence on the values of the number of packets M and the number of bits per packet n for varying channel characteristics (erasure probabilities). The case of satellite communications is used as an example of a high latency channel.

Figure 5:
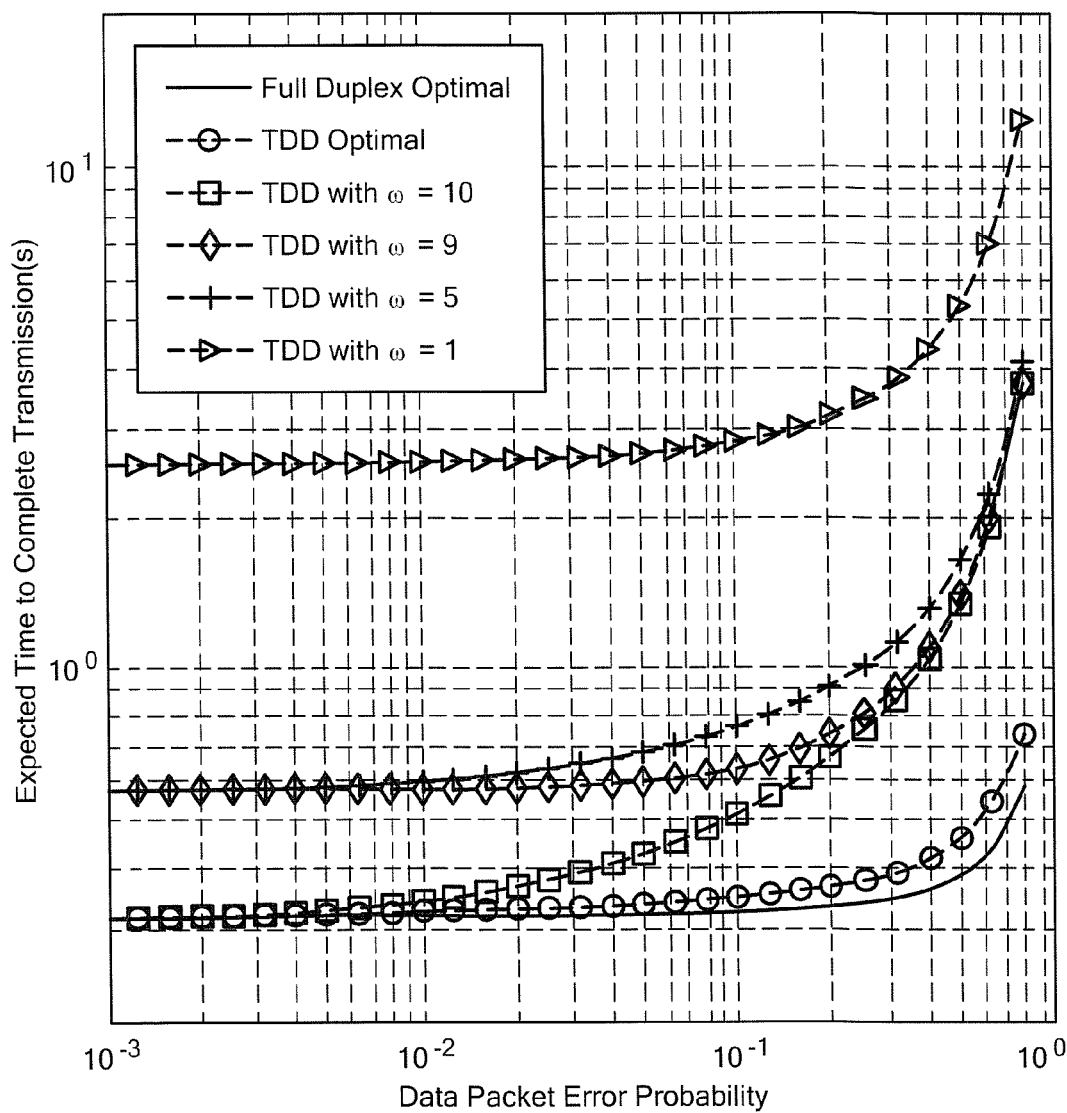
FIG. 5 is a plot of Expected Time to Complete Transmission vs. Data Packet Error Probability.

Referring now to FIG. 5, expected times for transmitting M data packets successfully versus Data Packet Error Probability (Pe) in an exemplary satellite system is shown. A link with parameters specified in the figure is assumed. In particular, the parameters used are M=10 data packets of size n=10000 bits, with different packet error probabilities in a GEO satellite link with a propagation delay of 125 ms (i.e. $T_{rt}$=250 ms), data rate 1.5 Mbps, $n_{ack}$=100 bits, g=100 bits, h=80 bits, $Pe_{ack}$=0.001.

It should be noted that that the novel network coding scheme (TDD optimal) described herein and the network coding full-duplex optimal scheme have similar performance over a wide range of block error probabilities. In fact, for the worst case (Pe=0.8) presented in FIG. 5, the novel scheme described herein has an expected time of completion only 29% above the full-duplex scheme. This is surprising considering that the transmitter in the full-duplex scheme sends coded packets non-stop until an ACK packet is received. The explanation for this behavior is that the novel scheme described herein is sending enough coded packets, given the channel conditions, so that the number of stops to listen (which are very costly) is reduced or in some case even minimized. Thus, the novel scheme described herein can have similar performance to that of a full-duplex optimal scheme, in the sense of expected time to completion. Most importantly, the novel scheme described herein is likely to have a much better performance in terms of energy consumption due to long periods in which the transmitter stops to listen for ACK packets.

FIG. 5 also shows the performance of the comparison described above. Note that when ω=10, i.e. the transmitter sends at most ten (10) coded packets before stopping to listen, the performance is comparable to the TDD optimal scheme when the block error probability is low. This fact confirms that for low block error probabilities the optimal choice of coded packets to transmit when i DOF are required at the receiver ($N_i$) is simply i. In other words, if M=10 and the block error probability is low, the first transmission contains 10 coded packets. Note that using ω=9 already suffers from a considerable degradation in performance even for low Pe because the transmitter cannot transmit the minimum number of coded packets (M) necessary to decode the information after the first transmission, and so it must transmit at least one more coded packet after the first ACK. Note that the performance of ω=5 and ω=9 is similar for low block error probability because both of them require at least two stops to listen for ACK packets in order to relay all the information, and it is the stopping time that affects delay the most on a high latency channel. For the case of ω>10 one would see a degradation for low Pe, with respect to optimum, because more packets than necessary are transmitted.

Finally, it should be noted that for the worst data error probability in FIG. 5, all fixed schemes (TDD with fixed ω) take at least five (5) times more time to complete transmission than the network coding full-duplex optimal scheme. The case of ω=1 can be interpreted as the performance of the Stop-and-Wait ARQ scheme under the same channel conditions, which is considerably worse than other schemes.

Turning now to the problem of maximizing the parameter η (i.e. throughput), it may be recalled that for this setting a node streams data which is subdivided into blocks that are then transmitted using the novel techniques described herein. Considering again a satellite link, given a fixed bit error probability ($Pe_{bit}$=0.0001) the problem of computing the optimal number of bits n per packet given some value of M can be addressed. In these examples, for the case of a symmetric channel with independent bits $Pe=1-(1-Pe_{bit})^{h+n+gM}$ and $Pe_{ack}=1-(1-Pe_{bit})^{n_{ack}}$.

Figure 6:
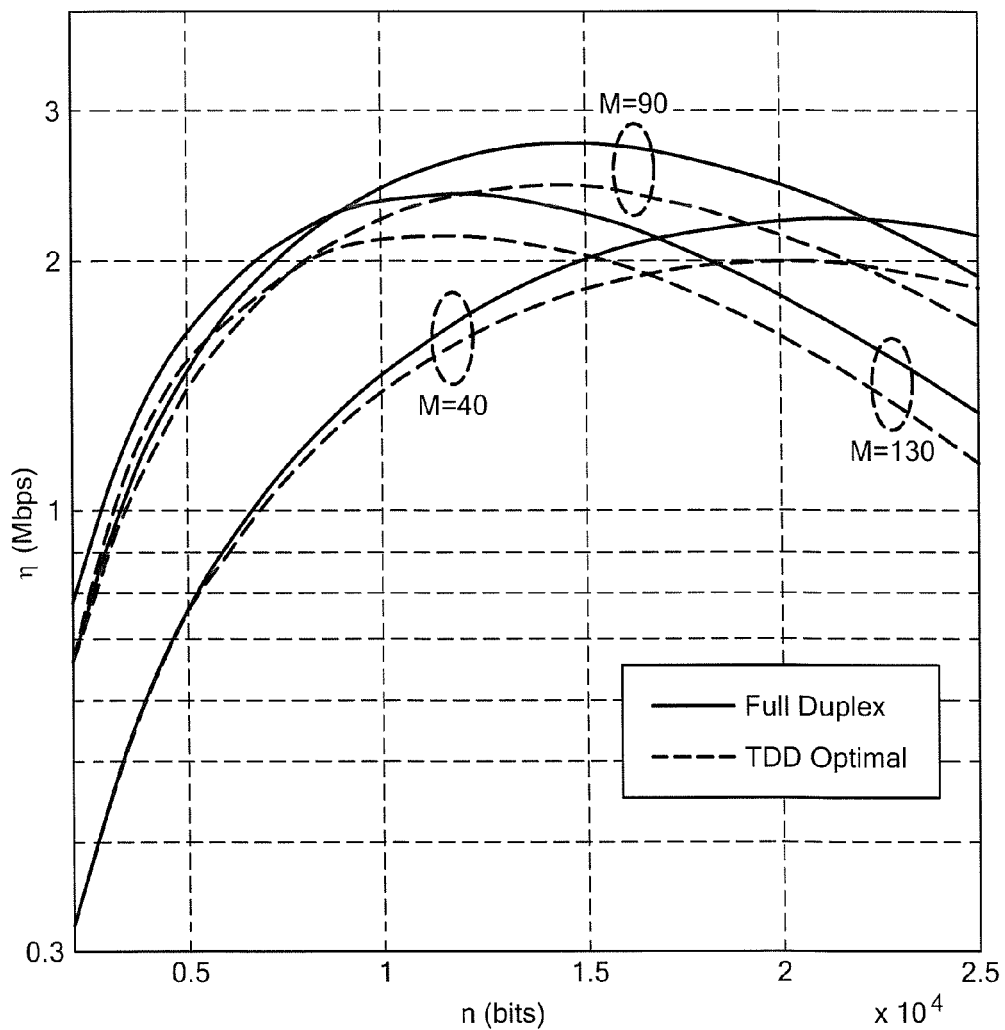
FIGS. 6 and 7 are plots of mean throughput lower bound (η) vs. number of bits in a data packet (n)

Referring now to FIG. 6, FIG. 6 illustrates the values of throughput η in Mbps given different choices of number of packets M and number of bits per packet n. First, it should be noted that for each value of M there exists an optimal value of n. Thus, an arbitrary choice of n can produce a considerable degradation in performance in terms of throughput. Secondly, there is an (M, n) pair that maximizes the value of throughput η. Finally, the performance of the full-duplex network coding and the TDD optimal scheme described herein is comparable for different values of n and M.

Figure 7:
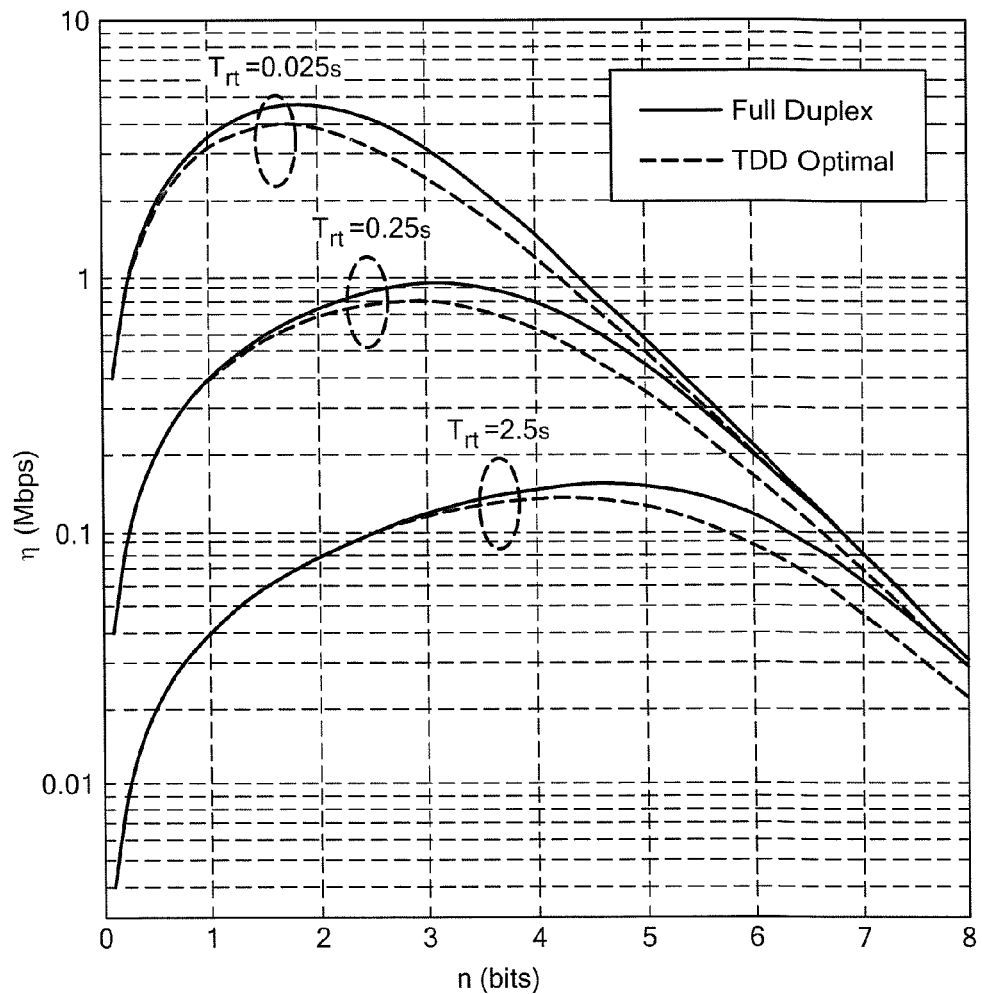

Referring now to FIG. 7, FIG. 7 shows throughput η in Mbps when the round-trip time $T_{rt}$ is changed. As expected, a lower $T_{rt}$ allows more throughput in TDD. Again, it is observed that the novel TDD optimal scheme described herein has comparable performance to the full-duplex scheme. The performance of the optimal novel TDD network coding scheme described herein can be compared with typical TDD ARQ schemes: Go-back-N (GBN) and Selective Repeat (SR).

Figure 8:
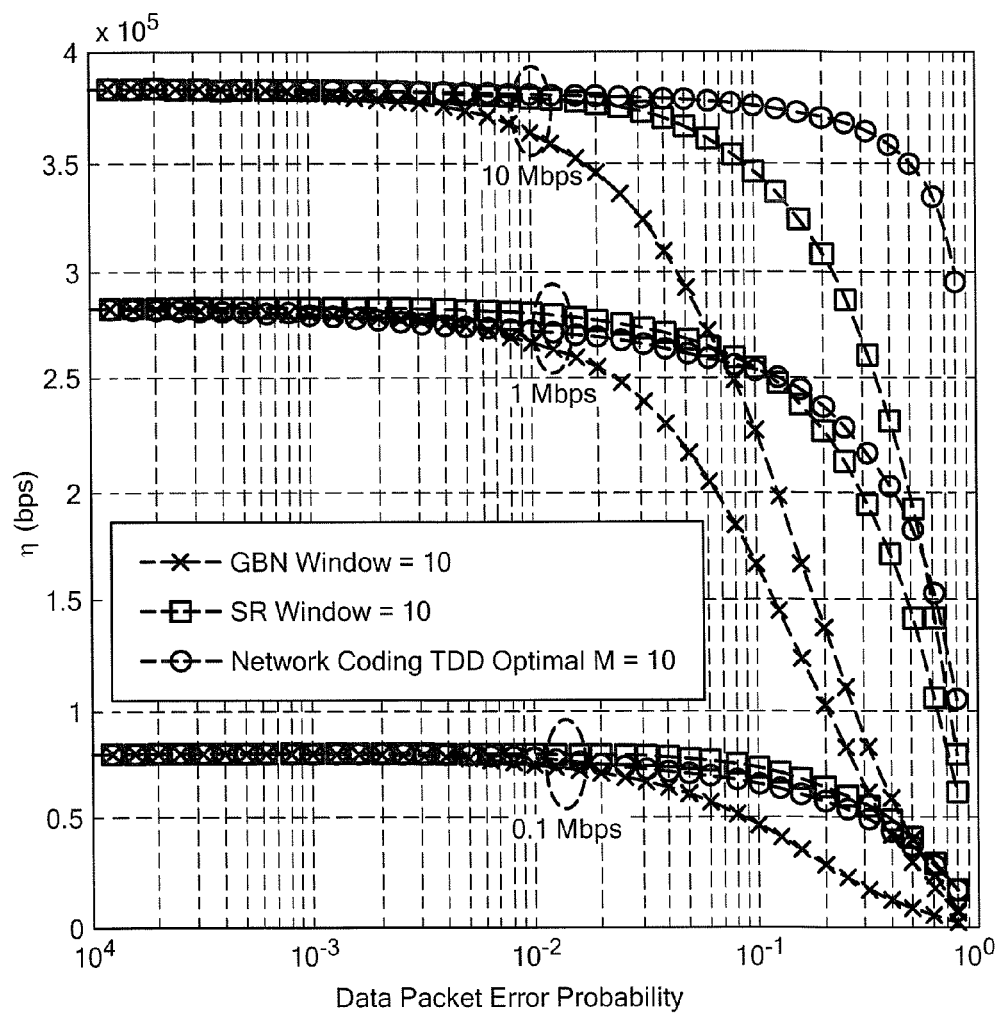
FIGS. 8 and 9 are plots of mean throughput lower bound (η) vs. Data Packet Error Probability.

FIG. 8 For this comparison, the throughput η factor for the half-duplex version's of these schemes is used.

In the notation used herein, the equivalent throughputs η's are given by $η_{GBN}$ and $η_{SR}$ for GBN and SR, respectively:

$$η_{GBN} = \left(\frac{n(1-Pe)(1-(1-Pe)^W)}{(WT_p + T_w)Pe}\right) \quad (26)$$

and $$η_{SR} = \left(\frac{Wn(1-Pe)}{(WT_p = T_w)}\right) \quad (27)$$

where W is the window size.

Referring now to FIG. 8, FIG. 8 shows throughput η for a satellite communications system with a fixed packet size of n=10000 bits, $n_{ack}$=100 bits, $T_{rt}$=250 ms, $Pe_{ACK}$=0 for all schemes, a window size of W=10 for the ARQ schemes, and g=20 bits and M=10 for our network coding scheme. Different data rates are used to illustrate different latency scenarios, where higher data rate is related to higher latency. Note that the performance of the novel scheme described herein is the same as or similar to both GBN and SR at low data packet error probability, which is expected because the window size W is equal to the block size M of the novel scheme described herein and very few errors are expected. The novel scheme described herein has a slightly lower throughput η for low Pe because each coded data packet includes gM additional bits that carry the random encoding vectors. This effect is less evident as latency increases. In general, the novel scheme described herein has better performance than GBN.

FIG. 8 also shows that for low latency (0.1 Mbps) η of the novel scheme described herein is very close to that of the SR ARQ scheme for all values of Pe, and better than the GBN scheme for high Pe. These results are surprising, because the novel scheme described herein constitutes a block-by-block transmission scheme which will not start transmission of a new set of M data packets until the previous ones have been received and acknowledged. Note also that, as latency increases, the novel scheme described herein shows much better performance than the SR scheme for high Pe. The case of 10 Mbps and Pe=0.8 shows that the novel scheme described herein is more than three (3) times greater than that of SR.

Figure 9:
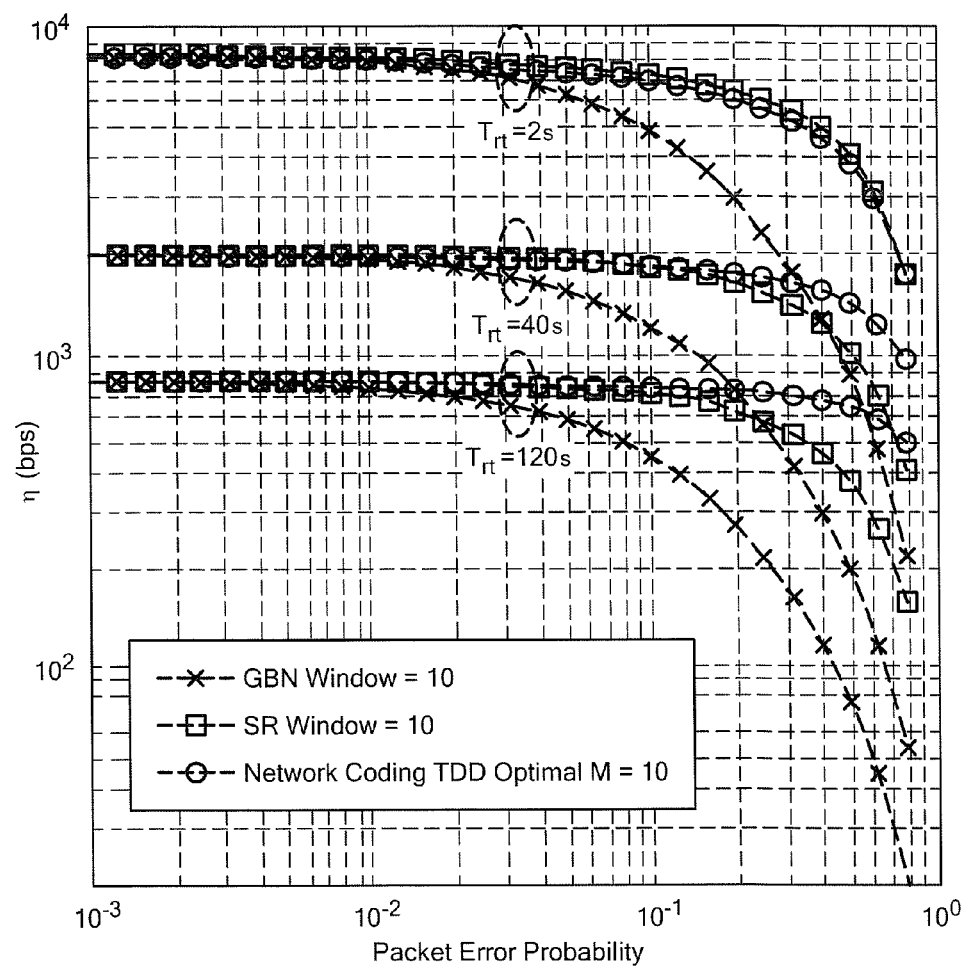

FIG. 9 shows throughput n for an underwater communications channel for a fixed data rate of 10 kbps and different $T_{rt}$. In this example, a fixed packet size of n=10000 bits, nack=100 bits, $Pe_{ACK}$=0 is used for all schemes, a window size of W=10 is used for the ARQ schemes, and g=20 bits and M=10 is used for the novel network coding scheme described herein. It should be noted that the overhead of transmitting M coefficients of g bits per coded packet is only 2%. Thus, this effect cannot be appreciated in the figures. Again, the performance of the novel network coding scheme described herein is the same as or similar to both GBN and SR at low data packet error probability. Since the data rate is kept fixed, at higher $T_{rt}$, the novel network coding scheme described herein gets higher latency. The throughput performance is similar to that observed in FIG. 8 if the comparison is carried out in terms of latency.

Another advantage of the novel network coding scheme described herein with respect to SR ARQ is that the novel scheme described herein relies on successfully transmitting one block of M data packets before transmitting a new one. In fact, the novel scheme described herein reduces or in some cases even minimizes the delay of every block. In contrast, the SR ARQ does not provide any guarantee of delay for any data packet, e.g. the first packet of a file to be transmitted could be the last one to be successfully received. In this sense, the comparison between standard schemes and the novel scheme described herein comparison is not completely fair, as it favors the standard schemes. Nonetheless, the novel scheme described herein is providing similar or better performance than SR but guaranteeing low transmission delays in individual data packets.

Having described preferred embodiments which serve to illustrate various concepts, structures and techniques which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A machine implemented method for transmitting data over a on delay, half-duplex channel where a device can transmit or receive, but not both at the same time, the method comprising:
   (a) for M information packets, generating $N_M$ linear coded packets;
   (b) transmitting the $N_M$ linear coded packets to a receiving node;
   (c) receiving an acknowledgement packet from the receiving node in response to transmitting the $N_M$ linear coded packets; and
   (d) determining an optimal number of coded packets $N_i$ to transmit in a next transmission before stopping to wait for another acknowledgment packet from the receiving node, wherein the optimal number of coded packets $N_i$ is based, at least in part, on a number of degrees of freedom (DOFs) the receiving node needs to decode the M information packets from received coded packets.

2. The method of claim 1, wherein:
the acknowledgement packet received from the receiving node includes an indication of the number of DOFs the receiving node needs to decode the M information packets from received coded packets.

3. The method of claim 2, further comprising:
   (e) generating $N_i$ linear coded packets;
   (f) transmitting the $N_i$ linear coded packets to the receiving node;
   (g) receiving another acknowledgement packet from the receiving node in response to transmitting the $N_i$ linear coded packets, the another acknowledgement packet including an updated indication of a number of degrees of freedom (DOFs) the receiving node needs to decode the M information packets from received coded packets.

4. The method of claim 3, further comprising:
repeating determining an optimal number of coded packets $N_i$, generating $N_i$ linear coded packets, transmitting the $N_i$ linear coded packets, and receiving another acknowledgement packet from the receiving node in response to transmitting the $N_i$ linear coded packets until the number of DOFs indicated in an acknowledgement packet is zero.

5. The method of claim 1, wherein:
the optimal number of coded packets $N_i$ is based, at least in part, on packet error probability in the channel.

6. The method of claim 1, wherein:
the optimal number of coded packets $N_i$ is based, at least in part, on latency in the channel.

7. The method of claim 1, wherein:
the acknowledgement packet received from the receiving node includes an indication of the optimal number of coded packets $N_i$ to transmit in the next transmission, wherein determining an optimal number of coded packets $N_i$ to transmit in a next transmission includes obtaining the optimal number from the acknowledgement packet.

8. The method of claim 1 wherein the optimal number of coded packets is based, at least in part, upon one or more of:
   (i) a mean time to completion of transmission of the M information packets; or
   (ii) a mean energy to completion of transmission of the M information packets.

9. The method of claim 1 wherein the optimum number of coded packets to transmit is selected to minimize an expected mean time to complete transmission of the M information packets.

10. The method of claim 9 wherein generating $N_M$ linear coded packets comprises generating $N_M$ linear coded packets having a fixed packet size.

11. The method of claim 1 wherein if (b) corresponds to a first transmission to the receiving node, the method further comprises determining an optimal number of coded packets $N_M$ the transmitter will send in the first transmission.

12. The method of claim 1, wherein:
the optimal number of coded packets $N_i$ to transmit in a next transmission is zero if the number of DOFs the receiving node needs to decode the M information packets from received coded packets is zero.

13. A machine implemented method for transmitting data over a long delay, half-duplex channel where a device can transmit or receive, but not both at the same time, the method comprising:
   (a) for M information packets, generating $N_M$ linear coded packets;

(b) transmitting the $N_M$ linear coded packets to a receiving node;

(c) receiving an acknowledgement packet from the receiving node in response to transmitting the $N_M$ linear coded packets;

(d) determining an optimal number of coded packets to send in a next transmission based, at least in part, upon information in the acknowledgement packet; and (e) using information in the acknowledgment packet to update an estimate of packet error probability.

14. The method of claim 13, wherein:

the acknowledgement packet received from the receiving node includes an indication of the number of DOFs the receiving node needs to decode the M information packets from received linear coded packets; and determining an optimal number of coded packets to send in a next transmission is based, at least in part, upon the number of DOFs the receiving node needs to decode the M information packets from received linear coded packets.

15. The method of claim 13 wherein if (b) corresponds to a first transmission to the receiving node, the method further comprises determining an optimal number of coded packets $N_M$ (corresponding to M information packets) to send in the first transmission.

16. A device for transmitting data over a long delay, half-duplex channel where the device can transmit or receive, but not both at the same time, the device comprising:

(a) an encoder to generate $N_M$ linear coded packets, for M information packets;

(b) a transmitter to transmit the $N_M$ linear coded packets to a receiving node;

(c) a receiver to receive an acknowledgement packet from the receiving node in response to transmission of the $N_M$ linear coded packets; and (d) a processor to determine an optimal number of coded packets the transmitter will send in a next transmission based upon information in the acknowledgement packet, wherein the optimal number of coded packets is based, at least in part, on a number of degrees of freedom (DOFs) the receiving node needs to decode all of the M information packets from received linear coded packets.

17. The device of claim 16 wherein the acknowledgment packet includes an indication of the number of DOFs the receiving node needs to decode all of the M information packets from received linear coded packets and the processor uses the number of DOFs to determine the optimal number of coded packets the transmitter will send in the next transmission.

18. The device of claim 16, wherein:

the optimal number of coded packets $N_i$ is based, at least in part, on packet error probability in the channel.

19. The device of claim 16, wherein:

the optimal number of coded packets $N_i$ is based, at least in part, on latency in the channel.

20. The device of claim 16, wherein:

the acknowledgement packet received from the receiving node includes an indication of the optimal number of coded packets $N_i$ to transmit in the next transmission, wherein the processor determines the optimal number of coded packets $N_i$ to transmit in the next transmission by obtaining the optimal number from the acknowledgement packet.

21. The device of claim 16 wherein the optimal number of coded packets $N_i$ is based, at least in part, upon one or more of:

(i) a mean time to completion of transmission of the M information packets; or (ii) a mean energy to completion of transmission of the M information packets.

22. The device of claim 16 wherein the optimum number of coded packets $N_i$ is selected to minimize an expected mean time to complete transmission of the M information packets.

23. The device of claim 16 wherein the $N_M$ linear coded packets comprise $N_M$ linear coded packets having a fixed packet size.

24. A device for transmitting data over a long delay, half-duplex channel where the device can transmit or receive, but not both at the same time, the device comprising:

(a) an encoder to generate $N_M$ linear coded packets for M information packets;

(b) a transmitter to transmit the $N_M$ linear coded packets to a receiving node;

(c) a receiver to receive an acknowledgement packet from the receiving node in response to transmission of the $N_M$ linear coded packets;

(d) a first processor to determine an optimal number of coded packets the transmitter will send in a next transmission to the receiving node based upon information in the acknowledgement packet; and (e) a second processor to update an estimate of packet error probability using information in the acknowledgment packet.

25. The device of claim 24, wherein:

the acknowledgement packet includes an indication of a number of degrees of freedom (DOFs) the receiving node needs to decode all M information packets from received linear coded packets, and the first processor determines the optimal number of coded packets the transmitter will send based, at least in part, upon the number of DOFs.

26. The device of claim 24, wherein:

the optimal number of coded packets $N_i$ is based, at least in part, on packet error probability in the channel.

27. The device of claim 24, wherein:

the optimal number of coded packets $N_i$ is based, at least in part, on latency in the channel.

* * * * *